March 31, 1925.
H. F. LIVERMORE
PATTERN CHAIN
Filed Dec. 17, 1923
1,531,706
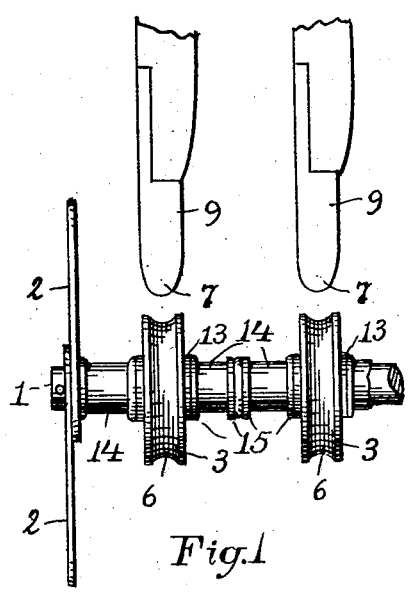
Fig. 1
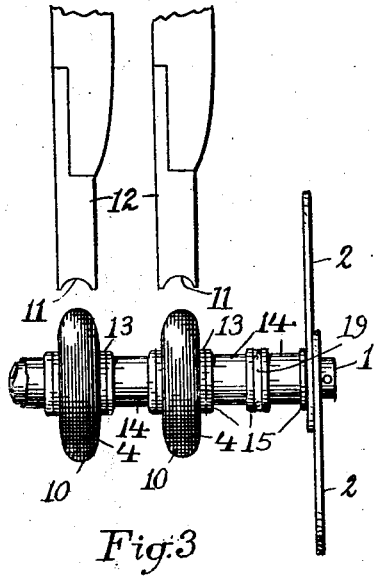
Fig. 3
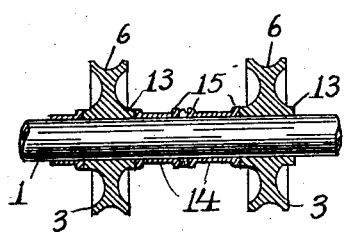
Fig. 2
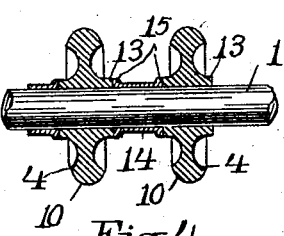
Fig. 4
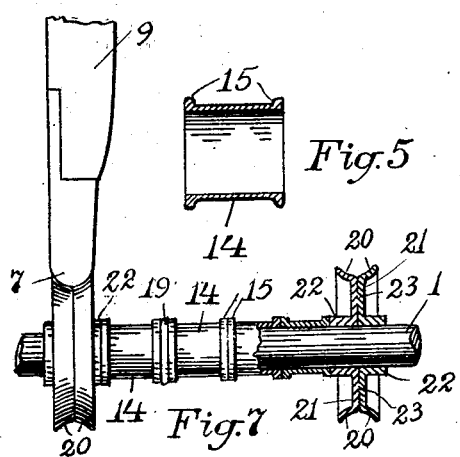
Fig. 5
Fig. 7
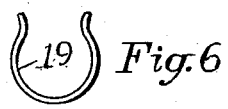
Fig. 6
Inventor,
Homer F. Livermore;
By A. B. Upham,
Attorney.

Patented Mar. 31, 1925.

1,531,706

UNITED STATES PATENT OFFICE.

HOMER F. LIVERMORE, OF BOSTON, MASSACHUSETTS.

PATTERN CHAIN.

Application filed December 17, 1923. Serial No. 681,142.

*To all whom it may concern:*

Be it known that I, HOMER F. LIVERMORE, a citizen of the United States, and a resident of Boston, in the county of Suffolk and Commonwealth of Massachusetts, have invented certain new and useful Improvements in Pattern Chains, of which the following is a full, clear, and exact specification.

This invention relates to pattern chains for looms, and it has for its object the construction of such a chain as will be more durable in use; wherein the shoes will not slip off from the risers after the parts have become somewhat badly worn, and one wherein the washers introduced between certain of the separators can be more economically manufactured and made more secure in their placing.

As heretofore made, the risers or rollers of the pattern chains are peripherally cylindrical and the shoes which are engaged thereby are correspondingly flat. The result is that after the parts have become more or less worn, the shoes are liable to slip off laterally from the risers and imperfect weaving to result. To remedy this I have found that making the contacting surfaces respectively concave and convex will wholly prevent the objectionable slipping off.

For preventing the undue wearing of the chain, I increase the diameter of the hubs of the risers, and provide the ends of the separators with radially projecting enlargements or shoulders which bear against the hubs of the risers.

The washers designed to be introduced between certain of the separators are rendered cheaper and more durable by being bent up from rectangular steel wire.

In the drawings forming part of this specification, Fig. 1 is a peripheral view of a portion of a pattern chain embodying my invention. Fig. 2 is a sectional view of the same. Fig. 3 is a peripheral view of a portion of another form of the invention. Fig. 4 is a sectional view of the same. Fig. 5 is a sectional view of one of the separators magnified. Fig. 6 is a view of one of the improved washers. Fig. 7 illustrates preferred forms of the invention.

In pattern chains of this type there are a large number of slender rods terminally coupled together by links and each bearing numerous risers spaced by separators.

Of such a chain I show in the drawings a part of one rod 1, links 2 at one end thereof, and risers 3 and 4, the cooperating shoes being designated by the reference numerals 9 and 12.

In the form of riser 3 illustrated in Fig. 1, its peripheral surface 6 is made concave, and the contacting surface 7 of the shoe 9 is made correspondingly convex, whereby as the risers pass beneath and elevate the shoes, the latter cannot slip off laterally.

In the form of riser 4 illustrated in Figs. 3 and 4, its peripheral surface 10 is made convex, and the corresponding surface 11 of the shoe 12 is made concave, thereby effecting the same certainty of engagement.

The hubs 13 of the risers, for the purpose of increasing their durability, are radially thickened, and the ends of the tubular separators 14 are provided with a flange or shoulder 15 at each end of a radial thickness to equal that of the hubs 13. By thus doubling the extent of surface in contact between the risers and the separators, the wear of each is correspondingly reduced. To make the entire length of each separator larger in diameter, while similarly lessening wear, would add so greatly to the weight and expense of the chain as to be prohibitive.

Since the hubs of the risers 3 and 4 are longer than the separators, and also to take up wear between a large number of risers and separators on the same rod, I provide one or more washers 19, shown in Fig. 6, preferably composed of wire bent into the horse-shoe form illustrated. These are not only inexpensive, but they are easily applied to the rods 1 by pressing them radially thereon. Previous to my invention, washers for this purpose were stamped from sheet metal, not only entailing more expense but providing a less convenient article.

By thus constructing the risers and shoes, the operation of the loom is rendered more certain in its action, and the machine can be speeded up to an extent which will make a material saving in the course of a month, and especially where many machines are employed. The saving in end-wear between the risers and the separators is likewise of considerable importance, not only in maintaining the alinement thereof during a long run, but in reducing the labor of frequent adjustments.

In the preferred form of my invention, that shown in Fig. 7, each riser is composed of sheet metal struck up in two like sections each consisting of a peripheral rim 20, a flat disk 21 and a hub 22 spot-welded together, as at 23, or otherwise united. The rim 20 is preferably outwardly curved so that, when the two riser-parts are united, the two rim-sections compose a concave rim substantially like the rim 6 illustrated in Fig. 1.

The advantage of this form of riser is that it is less expensive both in stock and labor, is far lighter, and even more durable than the risers shown in Figs. 1 to 4, while at the same time it preserves the self-centering engagement between its periphery and the shoe 9.

What I claim as my invention is:

A pattern chain for looms comprising rods bearing risers and separators, and washers each consisting of a length of wire bent into an approximate horse-shoe shape.

In testimony that I claim the foregoing invention, I have hereunto set my hand this 11 day of December, 1923.

HOMER F. LIVERMORE.